United States Patent [19]

Yui

[11] Patent Number: 4,928,305
[45] Date of Patent: May 22, 1990

[54] INTELLIGENT MODEM WITH MANUAL ESCAPE SWITCH

[75] Inventor: Eiichi Yui, Yokohama, Japan

[73] Assignee: Omron Tateisi Electronics Company, Kyoto, Japan

[21] Appl. No.: 273,829

[22] Filed: Nov. 21, 1988

[30] Foreign Application Priority Data

Nov. 25, 1987 [JP] Japan ................... 62-297101

[51] Int. Cl.$^5$ ........................... H04M 11/00
[52] U.S. Cl. ........................... 379/98; 375/8
[58] Field of Search ............. 379/93, 98, 97; 375/8, 375/9

[56] References Cited

U.S. PATENT DOCUMENTS 4,431,867  2/1984  Heatherington ............ 379/98
4,549,302  10/1985  Heatherington ............ 379/97 X
4,718,082  1/1988  Parker et al. ............... 379/98

FOREIGN PATENT DOCUMENTS 2136246  9/1984  United Kingdom ........... 379/96

Primary Examiner—Keith E. George
Attorney, Agent, or Firm—Dickstein, Shapiro & Morin

[57] ABSTRACT

An improvement is made in an intelligent modem system which can operate selectively either in a transparent mode in which a modem circuit of the system is placed in a data communication relationship with an information processing terminal while the modem circuit is connected with a public communication line, or in an escape mode in which the modem circuit of the system is placed out of the data communication relationship from the information processing terminal to permit altering of the status of the modem circuit while the modem circuit is connected with a public communication line, by using a switch element for selectively placing the modem circuit of the system in a data communication relationship, with the information processing terminal, when a manual reception and/or transmission mode is selected, also for effecting a change-over between the transparent mode and the escape mode, when an automatic reception and/or transmission mode is selected.

4 Claims, 3 Drawing Sheets

INTELLIGENT MODEM WITH MANUAL ESCAPE SWITCH

TECHNICAL FIELD

The present invention relates to an intelligent modem system which can perform a number of functions under the command from an internal microprocessor unit.

BACKGROUND OF THE INVENTION

Conventionally, an intelligent modem system incorporated with a microprocessor unit was able to operate selectively in any of the three modes, the command mode, the transparent mode or the escape mode.

In the command mode, the modem LSI (large-scale integrated circuit) of the system is separated from the public communication line as well as from the mother computer so that various functions of the modem LSI, such as the on-off of the echoing of transmitted data, and the activation of a speaker, setting up of the limit of the time interval of the absence of a carrier before the modem system is disconnected from the public communication line, etc., may be set up as desired according to the command from the mother computer.

In the transparent mode, the modem LSI is connected to the public communication line as well as to the mother computer in order to perform data communication in normal fashion.

In the escape mode, the modem LSI is connected to the public communication line but is disconnected from the mother computer so that the function of the modem LSI may be switched from one kind to another according to the command from the mother computer without disconnecting the modem LSI from the public communication line. Therefore, according to this mode, a desired change in the function of the modem LSI can be accomplished while the data communication is being carried out in the transparent mode without disconnecting the system from the public communication line as opposed to the command mode.

Conventionally, the switch-over from the transparent mode to the escape mode has been accomplished by transmitting a certain character string from the mother computer to the modem system. However, according to this method, since the character string must be entered from the keyboard of the mother computer every time the operation mode is desired to be changed, not only the operation itself is substantially cumbersome but also this character string cannot be a part of the data to be communicated. Furthermore, the modem system must always monitor the communicated data if it contains this character string or not, and the system program becomes complicated accordingly.

BRIEF SUMMARY OF THE INVENTION

In view of such problems of conventional modem systems, a primary object of the present invention is to provide an intelligent modem system which permits a simple switch-over from the transparent mode to the escape mode.

A second object of the present invention is to provide an intelligent modem system which does not require the use of a special character string to switch over from one mode to another, and can thereby eliminate the need for a special software program to monitor the special character string.

A third object of the present invention is to provide an intelligent modem system which does not pose any restrictions on the character strings that can be transmitted as data.

These and other objects of the present invention can be accomplished by providing an intelligent modem system which can operate selectively either in a transparent mode in which a modem circuit of the system is placed in a data communication relationship with an information processing terminal while the modem circuit is connected with a public communication line, or in an escape mode in which the modem circuit of the system is placed out of the data communication relationship from the information processing terminal to permit altering the status of the modem circuit while the modem circuit is connected with a public communication line, comprising: switch means which can effect a change-over from one of the modes to the other.

The present invention can be particularly favorably applied to an intelligent modem system which can operate selectively either in a manual reception and/or transmission mode or in an automatic reception and/or transmission mode, by using a switch element for selectively placing the modem circuit in a data communication relationship with the information processing terminal, when the manual reception and/or transmission mode is selected, to effect the switch-over between the transparent mode and the escape mode, when the automatic reception and/or transmission mode is selected.

Preferably, the system is provided with a display device such as a two-color LED lamp adjacent to the switch element to display which of the transparent mode and the escape mode is being selected.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
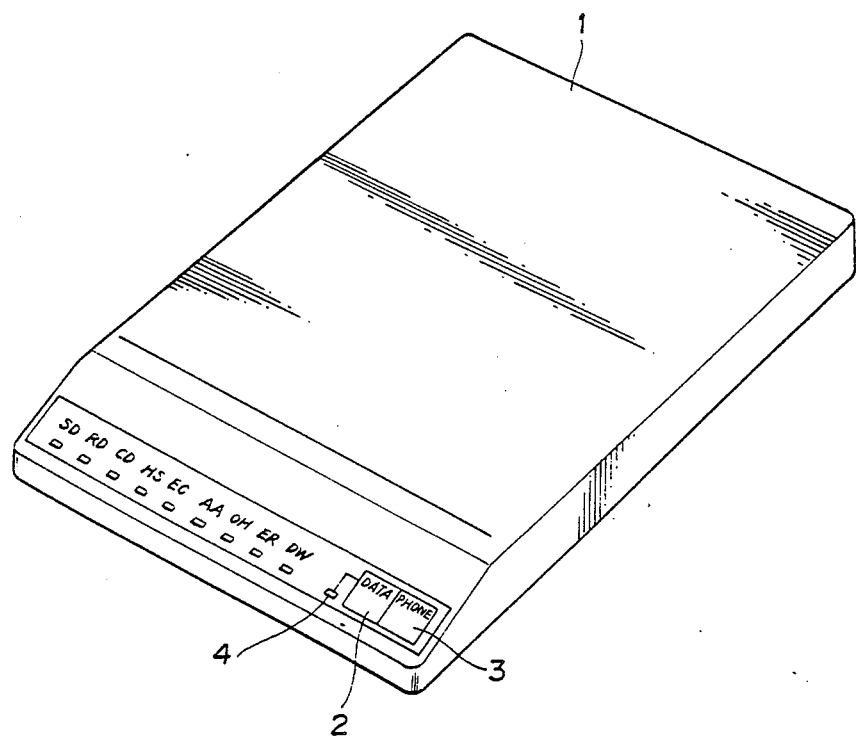
FIG. 1 is an external perspective view of an embodiment of the intelligent modem system according to the present invention.

FIG. 1 is a perspective view of the exterior of an embodiment of the modem system according to the present invention. The front face of the housing of this modem system 1 is provided with a DATA switch 2 and a PHONE switch 3, both of a momentary type. To the left of the DATA switch 2 is provided a mode display lamp 4 consisting of a pair of LED devices of red and green colors each of which can light up selectively and mutually exclusively either red or green to indicate the current operation mode.

This modem system 1 is adapted to three different modes, an automatic transmission and reception mode (AA mode), a manual transmission and automatic reception mode (MA mode), and a manual transmission and reception mode (MM mode). In a conventional modem system which is similar to that shown in FIG. 1, the DATA switch 2 was used to give a command to connect the modem LSI with a mother computer in the MA and MM modes, but served no useful purpose in the AA mode.

However, according to the present embodiment, when the transparent mode is selected and the AA mode is thereafter selected, the transparent mode can be changed to the escape mode and the two modes can be alternated thereafter by pressing the DATA switch 2. The mode display lamp 4 lights up in green color in the transparent mode and in red color in the escape mode. The PHONE switch 3 is provided for selecting between the state of data communication and the state of telephone communication.

Figure 2:
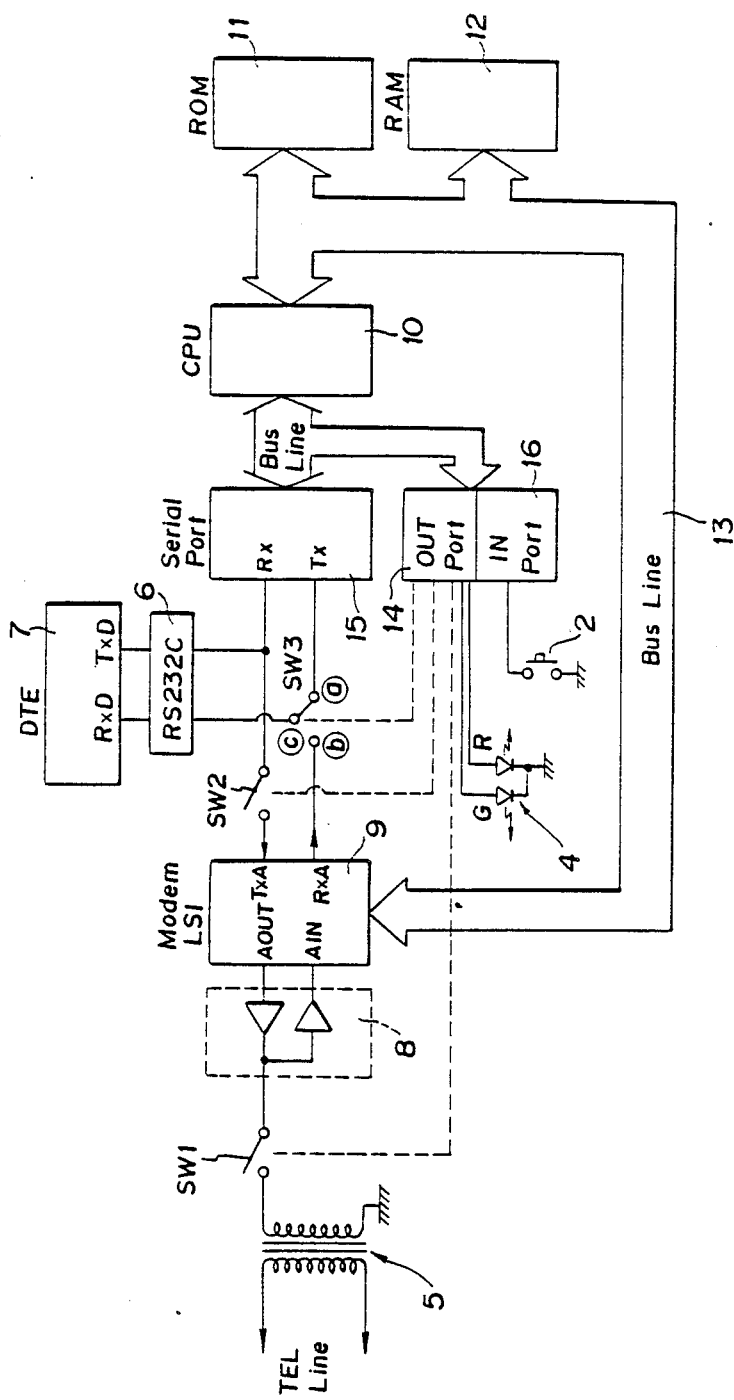
FIG. 2 is a block diagram of the intelligent modem system of FIG. 1.

FIG. 2 is a block diagram for illustrating the electric hardware structure of this modem system 1.

This modem system is connected to a public communication line or the TEL line via a communication transformer 5, and to an information processing terminal (which is referred to as DTE hereinafter) 7, such as a mother computer, via an RS232C interface 6.

Between the communication transformer 5 and the RS232C interface 6 are provided semiconductor switches SW1, SW2 and SW3, a hybrid circuit 8 and a modem LSI (large-scale integrated circuit) 9. The hybrid circuit 8 serves as a driver/receiver, and the modem LSI 9 is provided with various functions which can be selected by external control signals as well known. For instance, selection of a modulation system FSK (300), PSK (1,200) or QAM (2,400), selection of a communication speed 300 bps, 1,200 bps or 2,400 bps, adjustment of the volume level of the internal speaker, on-off control of the echoing of the transmitted data, on-off control of the monitor speaker, on-off control of the abort timer, etc. are possible with the modem LSI 9.

The modem LSI 9 and the switches SW1, SW2 and SW3 are controlled by a microcomputer which includes a CPU 10, ROM 11 and RAM 12. In other words, the various functions of the modem LSI 9 are controlled by the CPU 10 via a bus line 13. The switches SW1, SW2 and SW3 are on-off controlled by the CPU 10 via an OUT port 14.

The various commands issuing from the DTE 7 are supplied to the CPU 10 via an input RX of a full duplex serial port 15 while the data given from the CPU 10 to the DTE 7 are transmitted to the DTE 7 via an output TX of the full duplex serial port 15 and the switch SW3. The output from the DATA switch 2 is supplied to the CPU 10 via an IN port 16, while the mode display lamp 4 is controlled by a signal from the OUT port 14.

Now the states of the switches SW1, SW2 and SW3 in the command mode, the transparent mode and the escape mode are described in the following.

First of all, in the command mode, the switch SW1 is open, the switch SW2 is open and the switch SW3 forms a conductive path between a and c. Thereby, communication between the CPU 10 and the DTE 7 is possible while the modem LSI 9 is disconnected from the TEL line.

In the transparent mode, the switch SW1 is closed, the switch SW2 is closed, and the switch 3 forms a conductive path between b and c. Thereby, a communication path is established between the TEL line and the DTE 7 via the modem LSI 9, allowing data transmission in the transparent mode.

In the escape mode, the switch SW1 is closed, the switch SW2 is open, and the switch SW3 forms a conductive path between c and a. Thereby, the DTE 7 and the modem LSI 9 are disconnected from each other while the connection between the modem LSI 9 and the TEL line is maintained. On the other hand, the DTE 7 and the CPU 10 are connected to each other. As a result, the command from DTE 7 is received by the CPU 10, which in turn accesses the modem LSI 9, via the bus line 13, depending on the contents of the command, to set up any of the functions assigned to the modem LSI 9.

Figure 3:
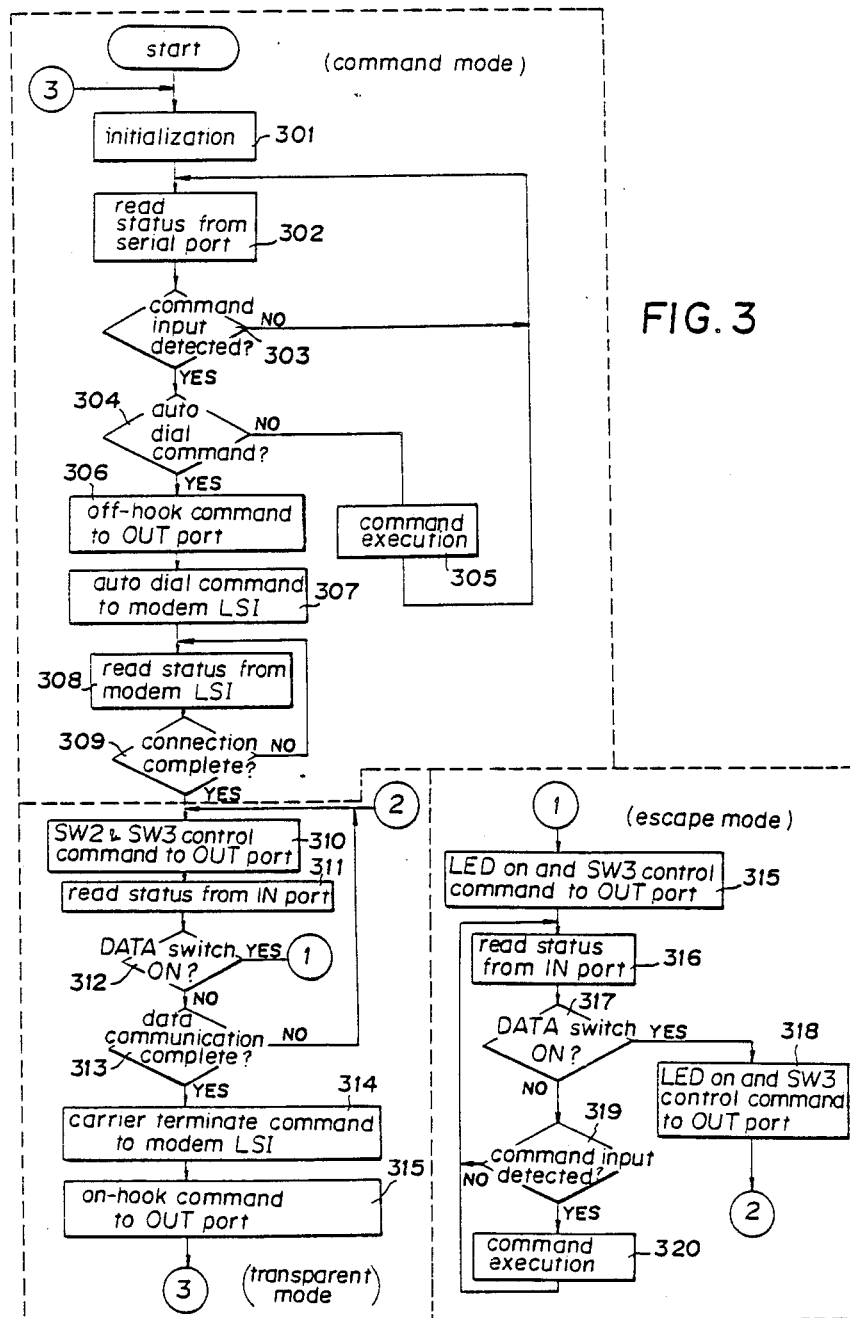
FIG. 3 is a flow chart of the control program of the intelligent modem shown in FIG. 2.

FIG. 3 is a flow chart of the control program which is executed in the CPU 10. Now the operation of the present embodiment is described in the following with reference to this flow chart.

When electric power is supplied to the system or the program is otherwise started to be executed, through an initialization sequence, the switch SW1 is turned off, the switch SW2 is turned off, and the switch SW3 forms a conductive path between c and a in step 301, whereby the command mode is produced.

Thereafter, the status of the serial port 15 is read out in step 302, and the command input from the DTE 7 is detected in step 303. If any command input is entered from the DTE 7 in step 303 and if the command is not the auto dial command in step 304, the entered command is executed and the various functions of the modem LSI 9 are set up in step 305. If no command input is detected in step 303, the system flow returns to step 302 to read status from the serial port.

On the other hand, if the entered command is the auto dial command in step 304, an off-hook command is given to the OUT port 14 in step 306 whereby the switch SW1 is turned on and the auto dial command is then given to the modem LSI 9 in step 307. Thereafter, the status of the modem LSI 9 is read out via the bus line 13 in step 308, and the system waits for the completion of line connection in step 309 by returning to step 308 when no line connection is detected.

When the line connection is completed in step 309, a command is give to the OUT port 14 to turn on the switch SW2 and to form a conductive path between c and b in the switch SW3, whereby the operation mode is changed from the command mode to the transparent mode in step 310. Thereafter, the status of the DATA switch 2 is read out from the IN port 16 in step 311, and the system waits for the conclusion of the current data communication in step 313 provided that the DATA switch 2 is not turned on in step 312. Conclusion of data communication is not detected in step 313, the system flow returns to step 310.

When the conclusion of the data communication is detected under this circumstance in step 313, a carrier discontinue command in given to the modem LSI 9 in step 314 and an on-hook command is given to the OUT port 14 in step 315. Thereafter, the command mode is restored as the system flow returns to step 301.

If the DATA switch 2 is turned on while the data communication is still in progress in step 312, an LED turn-on command is given to the OUT port 14 to change the color display of the mode display lamp 4 from green to red, and to cause the switch SW3 to form a conductive path between c and a in step 315. As a result, the operation mode changes from the transparent mode to the escape mode. Thereafter, the status of the DATA switch 2 is read out from the IN port 16 in step 316, and the system waits for a command input from the serial port 15 in step 319 provided that the DATA switch 2 is not turned on in step 319.

In this state, if any command is entered from the DTE 7 in step 319, the corresponding command is executed in step 320. Thus, the system can have access to the modem LSI 9 to set up or change the various functions of the modem LSI 9 via the bus line 13 while maintaining the connection with the TEL line.

On the other hand, if the DATA switch 2 is turned on in step 317, an LED turn-off command is given to the OUT port 14 to change the color display of the mode display lamp 14 from red to green and to cause the switch SW3 to form a conductive path between c and b in step 318, whereby the operation mode changes from the escape mode to the transparent mode.

In this way, according to this embodiment of the intelligent modem system according to the present invention, simply by pressing the DATA switch 2 in the transparent mode, the operation mode can be changed from the transparent mode to the escape mode. In this way, the escape mode and the transparent mode can be alternated simply by pressing the DATA switch 2. Therefore, the switch-over is more efficiently and simply performed as compared to the conventional systems in which the switch-over was effected by a command from the DTE.

In particular, according to this embodiment, by taking advantage of the fact that the DATA switch 2 has been typically equipped to modem systems of this kind but has served no useful purpose in the AA mode, the DATA switch 2 is used for achieving the switch-over from the transparent mode to the escape mode, whereby the mode switch-over is made possible without providing any additional switch and, therefore, without incurring any additional increase in the manufacturing cost.

Furthermore, since the DATA switch has conventionally been used for selectively connecting the modem LSI 9 with the DTE 7 in the MA and MM modes, the user will have a sense of unity and will hence feel comfortable when the DATA switch is used for switching over from the transparent mode to the escape mode.

Moreover, by arranging the DATA switch right next to the mode display lamp 4 to indicate which of the transparent mode and the escape mode is being selected, the user will have no difficulty in recognizing the current status of the system. This advantage can be enhanced by installing a two-color display lamp in place of a simple data communication display lamp without incurring any substantial increase in the manufacturing cost of the modem system.

What is claimed is:

1. An intelligent modem system comprising:
   a modem circuit;
   an interface circuit for connection to an information processing terminal;
   a switching means for interconnecting said modem circuit with a public communication line and with said interface circuit;
   a controller for controlling operation of said modem means and said switching circuit such that said system selectively operates in a transparent mode in which said switching means places said modem circuit in a data communication relationship with an information processing terminal connected to said interface circuit while said modem circuit is also placed in communication relationship with said public communication line, or in an escape mode in which said switching means takes said modem circuit out of a data communication relationship with said information processing terminal to permit altering the status of said modem circuit by said controller while said modem circuit remains connected with said public communication line; and,
   an operator operable switch means coupled to said controller for causing said controller to operate said switching means to change from one of said transparent and escape modes to the other of said transparent and escape modes.

2. An intelligent modem system as defined in claim 1, wherein said controller causes said modem circuit operate selectively either in at least one of a manual reception and transmission mode or in at least one of an automatic reception and transmission mode, said system further comprising a switch element for operating said controller to selectively place said modem circuit in a data communication relationship with said information processing terminal when said at least one manual reception and transmission mode is selected, wherein said switch element operates as said at least one operator operable switch means when said automatic reception and transmission mode is selected.

3. An intelligent modem system as defined in claim 2, further comprising display means for displaying which of said transparent mode and said escape mode said modem system is operating in.

4. An intelligent modem system as defined in claim 1, wherein successive operations of said operator operable switch means causes said controller to alternate between said transparent and escape modes.

* * * * *